United States Patent
Smith, Jr. et al.

(10) Patent No.: US 7,191,078 B2
(45) Date of Patent: Mar. 13, 2007

(54) OFFSET COMPENSATED POSITION SENSOR AND METHOD

(75) Inventors: Marshall E. Smith, Jr., Eaton, FL (US); Richard W. Stettler, Winter Haven, FL (US)

(73) Assignee: Wolff Controls Corporation, Winter Haven, FL (US)

( * ) Notice: Subject to any disclaimer, the term of this patent is extended or adjusted under 35 U.S.C. 154(b) by 118 days.

(21) Appl. No.: 10/995,963

(22) Filed: Nov. 23, 2004

(65) Prior Publication Data

US 2005/0177329 A1    Aug. 11, 2005

Related U.S. Application Data

(60) Provisional application No. 60/524,799, filed on Nov. 25, 2003, provisional application No. 60/524,919, filed on Nov. 25, 2003.

(51) Int. Cl.
*G06F 19/00* (2006.01)

(52) U.S. Cl. .................. 702/66; 73/865.9; 324/525

(58) Field of Classification Search .............. 702/66, 702/182–185, 57, 60, 64, 69; 477/98; 381/56, 381/94.2; 73/865.9; 324/525, 527, 600
See application file for complete search history.

(56) References Cited

U.S. PATENT DOCUMENTS

| | | | |
|---|---|---|---|
| 4,197,767 A * | 4/1980 | Leung | ................... 477/98 |
| 4,266,274 A | 5/1981 | Barman | |
| 4,618,908 A | 10/1986 | Anttila | |
| 4,656,989 A | 4/1987 | Yakuwa | |
| 5,983,155 A | 11/1999 | Bederna et al. | |
| 6,487,787 B1 | 12/2002 | Nahum et al. | |
| 6,516,658 B1 | 2/2003 | McCoy et al. | |
| 6,690,159 B2 | 2/2004 | Burreson et al. | |
| 2002/0162539 A1 | 11/2002 | Bolz et al. | |
| 2003/0200784 A1 | 10/2003 | Smith, Jr. et al. | |
| 2003/0226399 A1 | 12/2003 | Clingerman et al. | |
| 2004/0094338 A1 | 5/2004 | Skurnik | |

* cited by examiner

*Primary Examiner*—Edward Raymond
(74) *Attorney, Agent, or Firm*—Allen, Dyer, Doppelt, Milbrath & Gilchrist, P.A.

(57) ABSTRACT

A position sensor monitors relatively fast moving objects with signal conditioning for reduced power and reduced wiring. A transducer and related circuitry generate a dynamic signal proportional to a position of a moving object and also generate one or more low frequency or static (DC or zero frequency) error signals. The low or zero frequency error signals are removed and a position signal is generated using only two connections to a remote sensor monitor, thus allowing ease in multiplexing and reduced wiring.

26 Claims, 2 Drawing Sheets

OFFSET COMPENSATED POSITION SENSOR AND METHOD

CROSS-REFERENCE TO RELATED APPLICATIONS

This application claims the benefit of U.S. Provisional Application having Ser. No. 60/524,799 for Offset Compensated Position Sensor, and U.S. Provisional Application having Ser. No. 60/524,919 for Minimized Cross-Section Sensor Package, both having filing date Nov. 25, 2003, the disclosures of which are herein incorporated by reference in their entirety, both commonly owned with the instant application.

FIELD OF THE INVENTION

The present invention generally relates to sensors, and in particular to position and motion sensors.

BACKGROUND OF THE INVENTION

Many mechanical systems contain moving parts not directly linked through mechanical means whose position, timing, or speed must be monitored and controlled with correction schemes for safe or efficient operation. A prime example is the operation of diesel engine fuel injectors. These injectors are usually controlled either hydraulically through rapid compression of fuel or electrically through operation of a fast moving solenoid valve. In both systems, the timing and speed of the actual injection of fuel into the combustion chamber greatly depends on the characteristics of the fuel being used. This is especially true of biodiesel fuels that contain various entrained organic materials and gases that make the fuel compressible and change its viscosity or other characteristics that affect valve speed or timing.

Mechanical systems such as internal combustion engines usually contain a significant number of these moving objects. For instance, there are usually multiples of 4, 6, 8 or more cylinders in diesel engines utilizing fuel injectors each containing a moving valve or other object that must be monitored for efficient or safe operation. Each injector requires a separate sensor. The wiring of these sensors to a remotely located engine monitoring and control system must be designed to accommodate extreme temperatures and vibrations and adds cost and weight to the system. A method of reducing the amount of wires should be employed when implementing these position sensors for maximum efficiency and minimum cost. One widely accepted method of reducing the wiring is to provide output signals in the form of changes in current drawn by the sensor that is directly proportional to the position of the object being monitored. This allows the sensor to operate requiring only two wires; one to deliver operating voltage and current to the sensor and another to provide a ground reference and to form a complete path for the current through the sensor. An example is a sensor that draws zero milliAmperes when the object is at rest and draws 5 milliAmperes when the object is closest to the sensor, with intermediate currents being drawn when the object is between these extremes of movement. These sensors operate by drawing their current through an external resistance inline with their connecting wires such that the resistance develops a dropped voltage level that is directly proportional to the current through the sensor. For instance, connecting a 20-Ohm resistor inline with the 5-milliAmpere sensor listed above results in a varying voltage drop of 0 to 100 milliVolts across this inline resistor. This voltage drop is monitored by external devices to convert the current information into voltage information for further processing.

Mechanical systems such as internal combustion engines also are designed so that the objects that must be monitored are known to be moving within specific limits or windows of timing such that at least some objects are moving at times that other objects are known to be at rest. For instance, the internal combustion engine fuel injectors operate in sequences equally timed in relation to the rotational position of the crankshaft. For instance, injector number one opens between 0 and 25 degrees of rotation, injector number two operates between 50 and 75 degrees, and the like. A method of further reducing the number of wires required for these systems can be employed by multiplexing or connecting all sensors to the same set of wires and a single inline resistor. Since each signal from each individual sensor is known to be occurring within a separate period or window of time, monitoring equipment that also monitors this timing information can know which sensor output is being sampled at any particular time. In the example for the internal combustion engine, a timing signal may be developed from a separate sensor delivering the rotational position of the crankshaft that is used to inform the injector position sensor monitoring system which injector should be operating at any specific rotational position of the crankshaft. This information is used to tag or otherwise mark the pulse train from the monitoring resistor to identify each individual sensor output.

Position sensors used to monitor these moving objects generate an electrical signal that is proportional to the distance between the moving object and a fixed position. An ideal output signal contains only this information; however, several unwanted electrical signals generally characterized as noise are also usually generated or otherwise transmitted along with the desired position signal. These noise signals are generally divided into either low frequency or into high frequency noise. Higher frequency noise is usually easily filtered out with a low pass filter since the frequency of these noise signals is higher than the frequency of the position signal because moving objects are constrained to velocities that generate signals in or just above the audio or ultrasonic range and because in a well designed sensor these high frequency noise levels are usually several magnitudes in power level below the desired output position signal.

Most position sensing transducers also generate low frequency noise in the form of a slowly drifting or static DC offset, or error signals that may be a significant portion of the total overall signal. An example of such transducers is a Hall cell where the signal generated is produced by a magnet. The signal from this transducer contains a large DC offset voltage generated by the magnet and a smaller AC signal generated as the target changes the magnetic flux density. Another example is a capacitive or inductive sensor where the slowly changing signal is caused by semiconductor device drift caused by temperature or other changes. This slowly changing or static error signal causes numerous problems in employing two-wire current output position sensors. The generation of any signal current through the sensor causes power to be dissipated inside the sensor. This adds to the temperature of the devices in the sensor, reducing the maximum ambient temperature that the sensor can operate at and reducing overall sensor reliability. The addition of a relatively static or DC current through the output sensing resistor connected to any number of these sensors increases the voltage dropped across the resistor. This leaves less power for the sensors or means that the applied voltage must be increased to generate the required operating voltage for the sensors. This power is wasted and also requires a higher power capability for resistors, by way of example. Also, increased current through the sensor wires means they also must be increased in diameter to accommodate the increased power lost through their series resistance. A further limitation on these type sensors is that especially upon power-up, the sensor should desirably not draw a large amount of current and should automatically calibrate itself so that no excessive current is drawn at any time during its operation. For instance, on vehicles utilizing storage batteries, the initial power-up of these sensors usually occurs at the same time that the battery is being used to crank the engine, reducing the amount of power available to power the sensors.

SUMMARY OF THE INVENTION

The present invention is directed to sensing position or movement of an object. A position sensor signal conditioner and remotely electrically connected sensor monitoring equipment provide a method of multiplexing multiple numbers of sensors on a minimum number of wires with a minimum of energy required from each sensor monitoring system.

One embodiment of the invention is herein described as a sensor that may comprise a waveform generator and an error correction generator for modifying a sensing signal by removing unneeded power and providing the signal to a remote monitor via two wires useful in multiplexing multiple sensors. The waveform generator is operable for receiving an unconditioned sensing signal from a transducer and modifying the unconditioned sensing signal in response to an error correction signal for providing a conditioned sensing signal. The error correction generator may provide the error correction signal using a comparator for receiving the conditioned sensing signal and determining a value thereof, a controller for providing first and second timing signals responsive to the value of the conditioned sensing signal, and a signal processor for providing the error correction signal responsive to the first and second timing signals.

The error correction generator determines and eliminates strong static signals and error signals that do not deliver information about a position of an object being sensed, wherein inclusion of the static and error signals would require energy. One embodiment may include a digitally stored offset and error correction closed-loop compensation circuit for constantly comparing a value of the conditioned sensing signal to a desired minimum value and generates a correction signal that is subtracted from the offset and error signal to deliver a sensor signal output that is close to a desired minimum value. The constant comparing of the sensor signal output to the desired minimum value proceeds in a first direction relative to a direction of sensor output signals generated when an object being sensed moves in a relatively slow manner compared to a nominal speed of objects being monitored such that signals are generated as the objects move are not subtracted from the sensor output to a degree significant enough to cause significant variance between a position of the object and a signal level delivered by the sensor indicating the position. Further, the constant comparing of the sensor signal output to the desired minimum proceeds in a second direction relative to the direction of signals generated when the object being monitored moves in a relatively fast manner compared to the speed of objects being monitored so signals generated by errors or from other noise sources are subtracted from the sensor output in a manner sufficient to allow for a deletion of these error or static signals from being a significant portion of the position signal generated by the sensor.

One embodiment of the invention may include a window reference circuit that constantly compares a desired conditioned sensor signal output to an existing conditioned sensor signal output and adjusts the conditioned sensor signal output if it is above a preset high reference signal or below a preset low reference signal. The signal processor may generate a relatively small reference signal that is large enough to eliminate small values of drift in a negative going direction yet is small enough not to generate a significant amount of signal due to a discrete nature of calibration voltages from a DAC and counter combination employed thereby. The error correction generator may generate a relatively large reference signal that substantially exceeds the largest voltage encountered by the sensor as an object being monitored moves its maximum amount, allowing rapid recalibration due to sudden changes in an offset voltage caused by rapid temperature or other changes. Yet further, the signal processor may include a DAC and counter combination circuit that contains enough resolution such that even if a sensor offset correction signal is generated as a result of a change in sensor output due to a movement of an object being sensed, the error correction signal is not a significant portion of the conditioned sensing signal representative of a position of the object.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
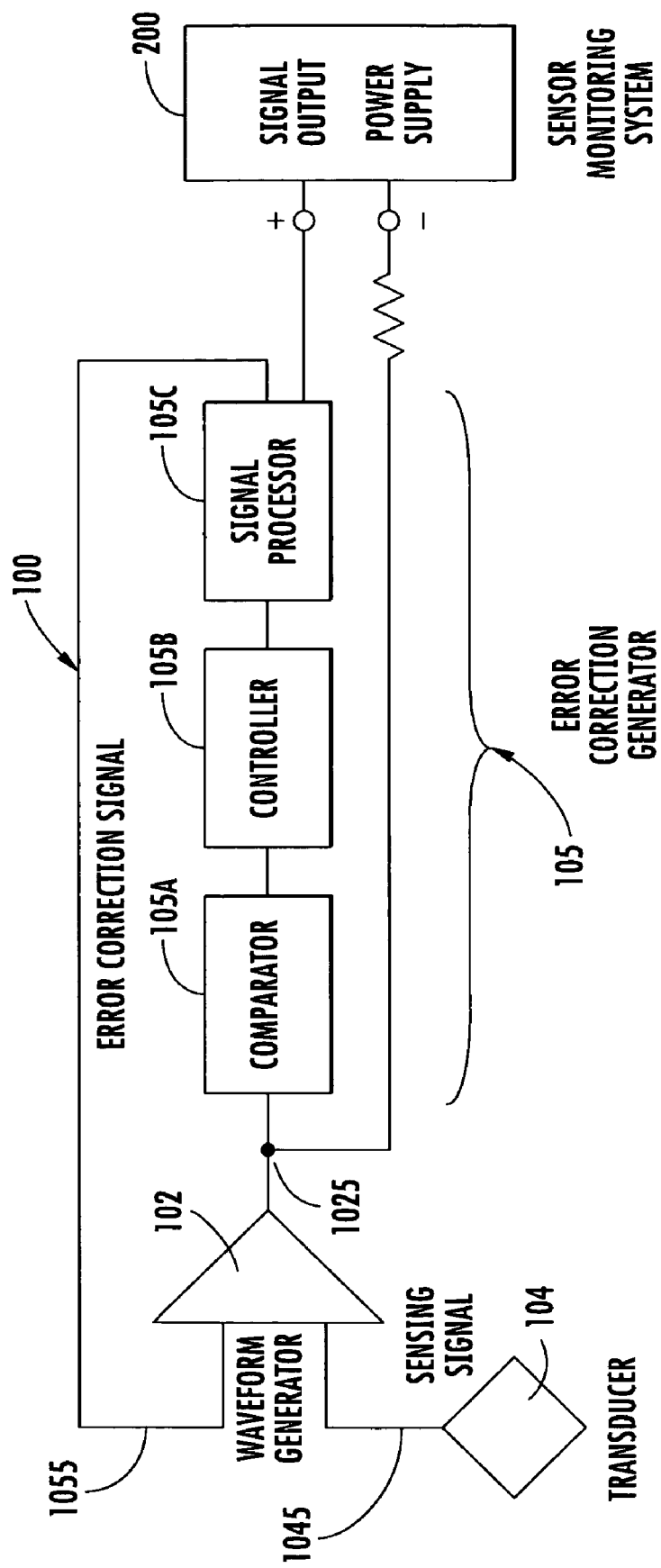
FIG. 1 is a functional block diagram illustrating one embodiment of a position sensor according to the teachings of the present invention.

With reference initially to FIG. 1, a position sensor 100 is herein described as including a waveform generator 102 operable for receiving an unconditioned sensing signal 104S from a transducer 104 and modifying the unconditioned sensing signal responsive to an error correction signal 105S for providing a conditioned sensing signal 102S. As will herein de described, a window reference circuit may constantly compare an ideal sensor output to the existing sensor output and adjust the output if it is above a preset large reference signal or below a preset small reference signal. An error correction generator 105 is operable with the waveform generator 102 for providing the error correction signal 105S. The error correction generator 105, as herein described by way of example, comprises a comparator 105A for receiving the conditioned sensing signal 102S and determining a value thereof, a controller 105B for providing first and second timing signals responsive to the value of the conditioned sensing signal, and a signal processor 105C for providing the error correction signal 105S responsive to the first and second timing signals. A sensor monitoring system 200 may be remotely located for providing power to the sensor 100 and receiving the conditioned sensing signal 102S via two wires, making the sensor 100 most desirable for multiplexing with other sensors.

Figure 2:
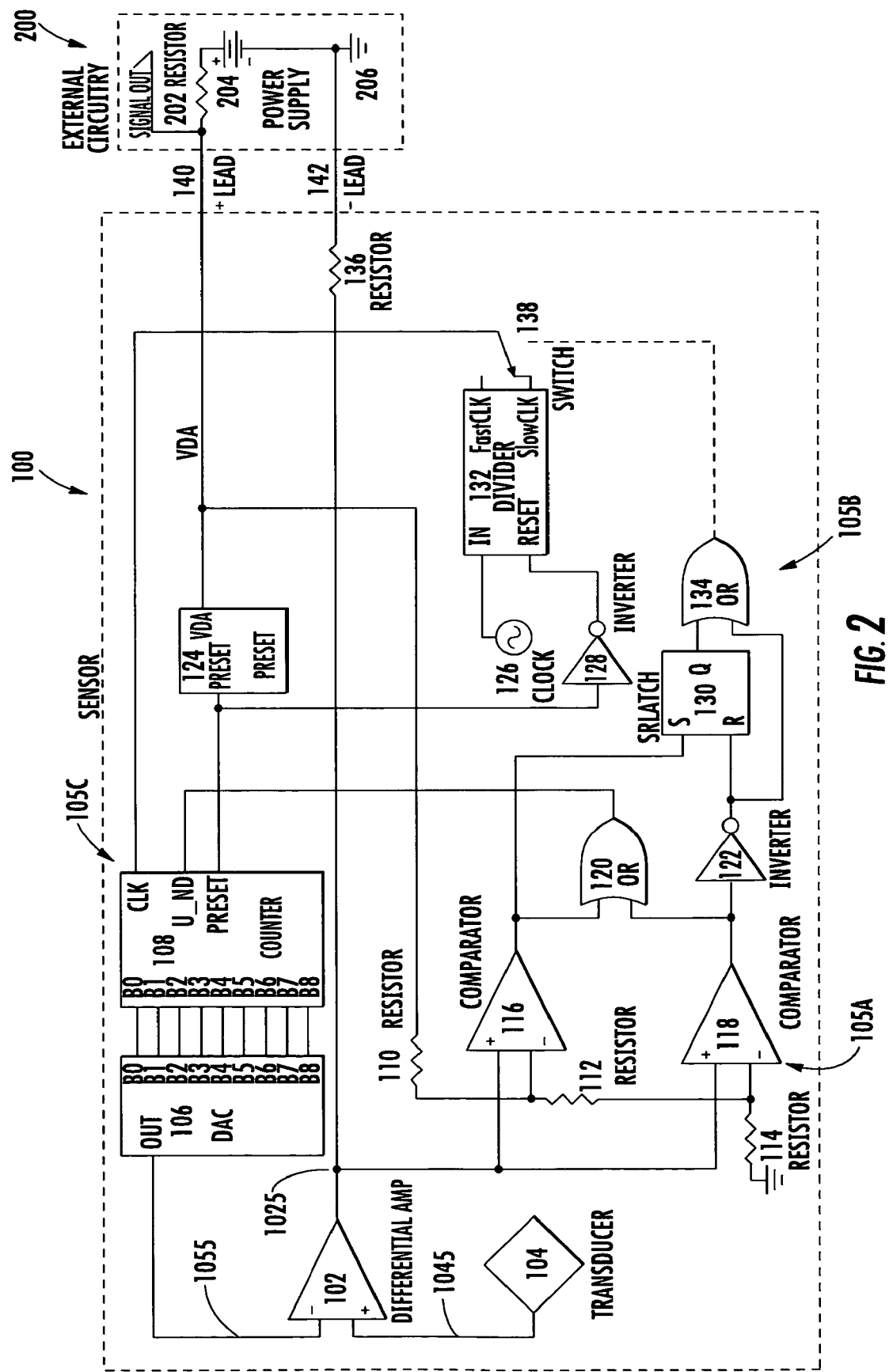
FIG. 2 is a schematic block diagram illustrating one electronic circuit implementation of position sensor of FIG. 1.

Referring now to FIG. 2, comparators 116 and 118, along with a voltage divider network composed of resistors 110, 112, and 114, comprise a window comparator, the comparator 105A that, along with the controller 105B including control logic having OR gates 120 and 134, inverters 122 and 128, SR Latch 130, Clock 126, and divider 132, control the count rate and direction of the signal processor 105C including a counter 108 and digital to analog converter (DAC) 106. The output 105S of the DAC 106 is subtracted from the output 104S of the transducer 104 in the waveform generator, herein presented as differential amplifier 102. The voltage divider network provides reference voltages to the negative pins of comparators 116 and 118. The reference to comparator 118 is the low end of the window and the reference to comparator 116 is the high end of the window. When the output of differential amplifier 102 is below the window the comparators 116 and 118 and logic system will cause counter 108 to count down at a high rate, providing, via the DAC 106, a negative going offset to the negative input of differential amplifier 102, causing its output to go positive. This output will keep going positive until it passes above the low end of the window at which time the comparators and logic will cause counter 108 to count down at a low rate. Counter 108 will count down at a low rate whenever the window comparator input is inside the window from below. A very high ratio between counting up and counting down around the lower edge of the window keeps the signal baseline right at the lower edge of the window when the signal is a pulse train. If the ratio was 1/1 the average pulse height would seek the lower end of the window. If, for some reason, a transient has driven the signal above the window, the comparators and logic will cause counter 108 to count down at a high rate until part of the signal has gone below the window. Thereafter it will only count down at a low rate.

Upon a rapid increase in sensor voltage on power-up, preset 124 generates a pulse that causes counter 108 and DAC 106 outputs to go to their highest value and the output of differential amplifier 102 to go to zero thereby lowering the current through resistor 136 to zero. Thus upon startup and initial calibration the sensor draws a minimum of current. Also, the sensor can be recalibrated at any time by external means by simply removing and reapplying power.

The low end of the window set by resistors 110, 112, and 114 is just high enough in value to compensate for any offset in comparator 118 that ordinarily might not allow the output of differential amplifier 102 to get below the comparator 118 threshold. This divider network also sets the value of the window on the negative pin of comparator 116 to a level substantially higher than the dynamic signal from the transducer 104 and differential amplifier 102 generated when an object moves or when a parameter being monitored by transducer 104 changes.

With reference to the controller 105B, logic may operate in the following manner. If the input to the window comparator 105A is below a preselected window, the resultant low output from comparator 118 is inverted by an inverter 122, placing a high signal into the lower input of Or gate 134 and forcing its output high which connects the wiper of switch 138 to a FastCLK pin of divider 132. At the same time, since the inputs to both comparators 116, 118 are low, both inputs to Or gate 120 are high which causes counter 108 to count down rapidly, causes the output 105S of DAC 106 to fall, and causes the output 102S of differential amplifier 102 to rise. When this output 102S rises above the lower edge of the window comparator 118, it goes high forcing the output of Or gate 120 high and the output of inverter 122 low and consequently the output of Or gate 134 low, changing connecting switch 138 to a SlowCLK pin. Counter 108 now counts down at the slow rate until the output of differential amplifier 102 goes below the window and the process continues to cycle. Generally, the slow clock signal will be used for error correction when a transducer output signal is anticipated, and a fast clock signal used for an error correction when noise and only error signals are expected.

When a sensor system baseline from differential amplifier 102 is in a desired position with all offset corrected, the high end of the window generated by the resistor network is significantly higher in value than a normal dynamic signal from differential amplifier 102 caused by a changing magnetic field.

As the object or process being monitored increases the output of differential amplifier 102, the components of the sensor operate to begin increasing the output of the DAC 106 in order to compensate for an increase in value. However, the rate of clock 126 is chosen to be slow enough that a significant number of changes of signal level do not occur during a fast movement of objects being monitored. Also, the number of bits chosen for the operation of the counter 108 and the DAC 106 are such that the increase and decrease in the output 105S, while the differential amplifier 102 output changes, are not a significant portion of the dynamic signal generated by the transducer 104 when the object being monitored moves. The DAC 106 and counter 108 combination may contain enough resolution such that even if sensor offset correction signal is generated as a result of a change in sensor output due to the movement of the object being sensed, the error correction signal is not a significant portion of the sensor position signal.

With the sensor 100, as herein described by way of example, there is a determination and elimination of strong static signals or other error signals that do not deliver information about the position of the object being sensed whose inclusion in the sensor output signal would waste energy. A digitally stored offset and error correction closed-loop compensation may thus constantly compare the sensor output to a desired minimum value and generate a correction that may be subtracted from the offset and error signal to deliver a sensor output that is as close to the desired, an ideal minimum, as is practical without requiring unnecessary circuitry that is typically used for signal conditioning. For the sensor 100, herein described, the constant comparison of the sensor output 102S to the desired value, an ideal minimum value, proceeds in a first direction relative to a direction of signals generated when the object (a target) being monitored moves in a relatively slow manner compared to the speed of objects being monitored such that signals are generated as the objects move that are not subtracted from the sensor output to a degree significant enough to cause significant variance between the position of the object and the position signal level delivered by the sensor. The constant comparison of sensor output proceeds in a second direction relative to the direction of signals generated when the object being monitored moves in a relatively fast manner compared to the speed of objects being monitored so that signals generated by errors or from other noise sources are subtracted from the sensor output in a manner sufficient to allow for a deletion of these error or static signals from being a significant portion of the position signal generated by the sensor.

By way of further example, in operation, the sensor 100 may generate a relatively small reference signal that is large enough to eliminate small values of drift in a negative going direction yet is small enough not to generate a significant amount of signal due to the discrete nature of the calibration voltages from the DAC and counter combination. A relatively large reference signal that may substantially exceed the largest voltage encountered as the object moves its maximum amount is accommodated by allowing rapid recalibration due to sudden changes in offset voltage caused by rapid temperature or other changes.

With reference again to FIG. 2, for the embodiment herein described by way of example, the sensor 100 is connected to the sensor monitoring system 200, external circuitry through a current-to-voltage converter resistor 202 to a power supply 204. Upon a rapid increase in sensor voltage caused by an inrush of current upon power-up, a preset 124 generates a signal that causes counter 108 to go to its highest value, driving DAC 106 output 105S to its highest value. The output 105S of DAC 106 thus drives differential amplifier 102 output 102S low. A resistor 136 is connected between the output of differential amplifier 102 and system ground 206 through a sensor lead 142. Thus, upon startup and initial calibration, the sensor 100 draws a minimum of current. For the embodiment herein described by way of example, the resistor 136 converts the voltage output 102S of the differential amplifier 102 to a current drawn through sensor leads 140 and 142. This results in a requirement of only two wires to connect the sensor 100 to the external circuitry of the monitoring system 200. The sensor 100 thus modulates a current across the pair of wires 140, 142 connected to the sensor monitoring system 200 where the modulated sensor current is converted into a modulated sensor signal voltage.

If system parameters change suddenly and significantly, causing a large and rapid increase in the output 102S of the differential amplifier 102, the voltage at the negative input pin of the comparator 116 is set by the values chosen for resistors 110, 112, and 114 to a value higher than the dynamic signal caused by the object moving. In this way movement of the object being monitored does not cause the sensor 100 to attempt a subsequent rapid calibration of the offset level.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A sensor comprising:
    a Hall effect transducer;
    a waveform generator operable for receiving an unconditioned sensing signal from the transducer and modifying the unconditioned sensing signal responsive to an error correction signal for providing a conditioned sensing signal; and
    an error correction generator operable with the waveform generator for providing the error correction signal, the error correction generator including:
        a comparator for receiving the conditioned sensing signal and determining a value thereof;
        a controller for providing first and second timing signals responsive to the value of the conditioned sensing signal; and
        a signal processor for providing the error correction signal responsive to the first and second timing signals.

2. The sensor according to claim 1, wherein the waveform generator comprises a differential amplifier operable for receiving the unconditioned sensing signal from the transducer and the error correction signal as analog input signals thereto, and wherein an output from the differential amplifier is a subtraction thereof for providing the conditioned sensing signal.

3. The sensor according to claim 1, wherein the signal processor comprises a signal storage and retrieval device.

4. The sensor according to claim 3, wherein the signal processor comprises a counter for receiving a digital timing signal including one of a fast clock pulse and a slow clock pulse, and a digital to analog converter for converting the digital timing signal to an analog error correction signal for input to the waveform generator.

5. The sensor according to claim 1, wherein the conditioned sensing signal is transmitted through a resistive network for providing a sensor output current signal representative of the conditioned signal.

6. The sensor according to claim 1, wherein the comparator comprises a voltage divider for connection to a power source, and a comparator circuit for establishing the value of the conditioned sensing signal.

7. The sensor according to claim 1, wherein the controller comprises a logic circuit for selecting from one of a fast clock pulse and a slow clock pulse responsive to the conditioned sensing signal, and a switch for switching therebetween in delivering the selected pulse to the controller.

8. The sensor according to claim 1, further comprising a monitoring system electrically connected thereto, wherein the conditioned sensing signal is provided as a sensing signal output current to be modulated across a pair of sensor wires connected to the monitoring system, the monitoring system converting the modulated sensor current into a modulated sensor signal voltage.

9. The sensor according to claim 1, further comprising a monitoring system for multiplexing multiple numbers of sensors on a minimum number of wires with minimum energy required from the monitoring system.

10. A sensor comprising:
    a waveform generator operable for receiving an unconditioned sensing signal from a transducer and modifying the unconditioned sensing signal responsive to an error correction signal for providing a conditioned sensing signal; and
    an error correction generator operable with the waveform generator for providing the error correction signal, the error correction generator including:
        a comparator for receiving the conditioned sensing signal and determining a value thereof;
        a controller for providing first and second timing signals responsive to the value of the conditioned sensing signal; and
        a signal processor for providing the error correction signal responsive to the first and second timing signals;

wherein the error correction generator determines and eliminates strong static signals and error signals that do not deliver information about a position of an object being sensed, wherein inclusion of the static and error signals would require energy.

11. A sensor comprising:
a waveform generator operable for receiving an unconditioned sensing signal from a transducer and modifying the unconditioned sensing signal responsive to an error correction signal for providing a conditioned sensing signal; and
an error correction generator operable with the waveform generator for providing the error correction signal, the error correction generator including:
  a comparator for receiving the conditioned sensing signal and determining a value thereof;
  a controller for providing first and second timing signals responsive to the value of the conditioned sensing signal; and
  a signal processor for providing the error correction signal responsive to the first and second timing signals;
wherein the error correction generator provides a digitally stored offset and error correction closed-loop compensation circuit that constantly compares a value of the conditioned sensing signal to a desired minimum value and generates a correction signal that is subtracted from the offset and error signal to deliver a sensor signal output that is close to a desired minimum value.

12. The sensor according to claim 11, wherein the constant comparing of the sensor signal output to the desired minimum value proceeds in a first direction relative to a direction of sensor output signals generated when an object being sensed moves in a relatively slow manner compared to a nominal speed of objects being monitored such that signals are generated as the objects move are not subtracted from the sensor output to a degree significant enough to cause significant variance between a position of the object and a signal level delivered by the sensor indicating the position.

13. The sensor according to claim 12, wherein the constant comparing of the sensor signal output to the desired minimum proceeds in a second direction relative to the direction of signals generated when the object being monitored moves in a relatively fast manner compared to the speed of objects being monitored so signals generated by errors or from other noise sources are subtracted from the sensor output in a manner sufficient to allow for a deletion of these error or static signals from being a significant portion of the position signal generated by the sensor.

14. A sensor comprising:
a waveform generator operable for receiving an unconditioned sensing signal from a transducer and modifying the unconditioned sensing signal responsive to an error correction signal for providing a conditioned sensing signal; and
an error correction generator operable with the waveform generator for providing the error correction signal, the error correction generator including:
  a comparator for receiving the conditioned sensing signal and determining a value thereof, wherein the comparator comprises a window reference circuit that constantly compares a desired conditioned sensor signal output to an existing conditioned sensor signal output and adjusts the conditioned sensor signal output if it is above a preset high reference signal or below a preset low reference signal;
  a controller for providing first and second timing signals responsive to the value of the conditioned sensing signal; and
  a signal processor for providing the error correction signal responsive to the first and second timing signals.

15. A sensor comprising:
a waveform generator operable for receiving an unconditioned sensing signal from a transducer and modifying the unconditioned sensing signal responsive to an error correction signal for providing a conditioned sensing signal; and
an error correction generator operable with the waveform generator for providing the error correction signal, the error correction generator including:
  a comparator for receiving the conditioned sensing signal and determining a value thereof;
  a controller for providing first and second timing signals responsive to the value of the conditioned sensing signal; and
  a signal processor for providing the error correction signal responsive to the first and second timing signals, wherein the signal processor generates a relatively small reference signal that is large enough to eliminate small values of drift in a negative going direction yet is small enough not to generate a significant amount of signal due to a discrete nature of calibration voltages from a DAC and counter combination employed thereby.

16. A sensor comprising:
a waveform generator operable for receiving an unconditioned sensing signal from a transducer and modifying the unconditioned sensing signal responsive to an error correction signal for providing a conditioned sensing signal; and
an error correction generator operable with the waveform generator for providing the error correction signal, the error correction generator including:
  a comparator for receiving the conditioned sensing signal and determining a value thereof;
  a controller for providing first and second timing signals responsive to the value of the conditioned sensing signal; and
  a signal processor for providing the error correction signal responsive to the first and second timing signals;
  wherein the error correction generator generates a relatively large reference signal that substantially exceeds the largest voltage encountered by the sensor as an object being monitored moves its maximum amount, allowing rapid recalibration due to sudden changes in an offset voltage caused by rapid temperature or other changes.

17. A sensor comprising:
a waveform generator operable for receiving an unconditioned sensing signal from a transducer and modifying the unconditioned sensing signal responsive to an error correction signal for providing a conditioned sensing signal; and
an error correction generator operable with the waveform generator for providing the error correction signal, the error correction generator including:
  a comparator for receiving the conditioned sensing signal and determining a value thereof;
  a controller for providing first and second timing signals responsive to the value of the conditioned sensing signal; and a signal processor for providing the error correction signal responsive to the first and second timing signals, wherein the signal processor includes a DAC and counter combination circuit that contains enough resolution such that even if a sensor offset correction signal is generated as a result of a change in sensor output due to a movement of an object being sensed, the error correction signal is not a significant portion of the conditioned sensing signal representative of a position of the object.

18. A position sensing method comprising:

receiving an unconditioned sensing signal from a transducer;

generating an error correction signal responsive to a desired conditioned sensing signal, wherein the error correction signal eliminates strong static signals and error signals that do not deliver information about a position of an object being sensed, and wherein such inclusion of the static and error signals would require energy;

modifying the unconditioned sensing signal responsive to an error correction signal for providing a conditioned sensing signal; and providing a conditioned sensing signal having a value with a range of desired values.

19. The method according to claim 18, wherein the unconditioned sensing signal modifying comprises:

comparing the conditioned sensing signal to the range of desired values, and determining a value for the conditioned sensing signal;

providing first and second timing signals responsive to the value of the conditioned sensing signal; and providing the error correction signal responsive to the first and second timing signals.

20. The method according to claim 18, further comprising a logic selecting between the first and second timing signals comprises selecting from one of a fast clock pulse and a slow clock pulse responsive to the conditioned sensing signal, and a switching therebetween for providing delivering the selected pulse and one of the first and second timing signals.

21. The method according to claim 18, further comprising monitoring the conditioned sensing signal as a sensing signal output current and modulated the current across a pair of sensor wires, and converting the current into a modulated sensor signal voltage.

22. A position sensing method comprising:

receiving an unconditioned sensing signal from a transducer;

generating an error correction signal responsive to a desired conditioned sensing signal, wherein the error correction signal provides a digitally stored offset and error correction closed-loop compensation process that constantly compares a value of the conditioned sensing signal to a desired minimum value and generates the correction signal that is subtracted from the offset and error signal to deliver a sensor signal output that is close to a desired minimum value;

modifying the unconditioned sensing signal responsive to an error correction signal for providing a conditioned sensing signal; and providing a conditioned sensing signal having a value with a range of desired values.

23. The method according to claim 22, wherein the constant comparing of the sensor signal output to the desired minimum value proceeds in a first direction relative to a direction of sensor output signals is generated when an object being sensed moves in a relatively slow manner compared to a nominal speed of objects being monitored such that signals are generated as the objects move are not subtracted from the sensor output to a degree significant enough to cause significant variance between a position of the object and a signal level delivered by the sensor indicating the position.

24. The method according to claim 22, wherein the constant comparing of the sensor signal output to the desired minimum proceeds in a second direction relative to the direction of signals is generated when the object being monitored moves in a relatively fast manner compared to the speed of objects being monitored so signals generated by errors or from other noise sources are subtracted from the sensor output in a manner sufficient to allow for a deletion of these error or static signals from being a significant portion of the position signal generated by the sensor.

25. A position sensing method comprising:

receiving an unconditioned sensing signal from a transducer;

generating an error correction signal responsive to a desired conditioned sensing signal;

modifying the unconditioned sensing signal responsive to an error correction signal for providing a conditioned sensing signal; and providing a conditioned sensing signal having a value with a range of desired valves;

wherein a relatively small reference signal is provided that is large enough to eliminate small values of drift in a negative going direction yet is small enough not to generate a significant amount of signal due to a discrete nature of calibration voltages.

26. A position sensing method comprising:

receiving an unconditioned sensing signal from a transducer;

generating an error correction signal responsive to a desired conditioned sensing signal;

modifying the unconditioned sensing signal responsive to an error correction signal for providing a conditioned sensing signal; and providing a conditioned sensing signal having a value with a range of desired values;

wherein a relatively large reference signal is provided that substantially exceeds the largest voltage encountered as an object being monitored moves its maximum amount, allowing for a rapid recalibrating due to sudden changes caused by rapid temperature changes.

* * * * *